(No Model.)
E. H. & C. MORGAN.
THILL SUPPORTER.
No. 273,877. Patented Mar. 13, 1883.
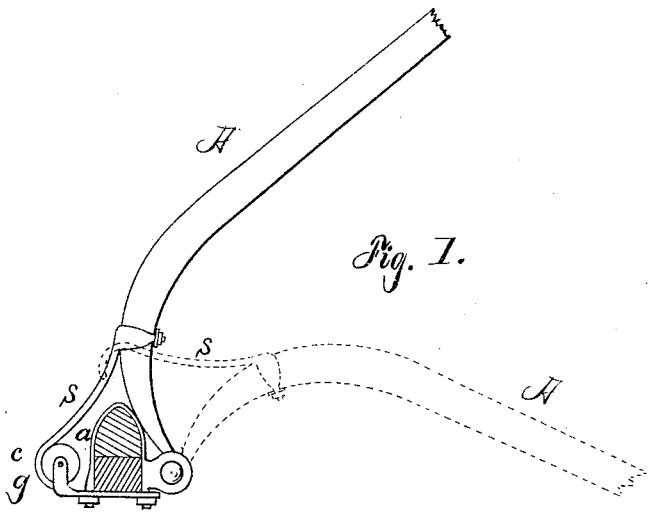
Fig. 1.
Fig. 3.
Fig. 2.
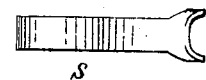
Fig. 4.
WITNESSES:
INVENTOR
Edgar H. Morgan
Charles Morgan
By Robt. H. Wiles
ATTORNEY

United States Patent Office.

EDGAR H. MORGAN AND CHARLES MORGAN, OF FREEPORT, ILLINOIS, ASSIGNORS TO MICHAEL LAWVER, ANTOINETTE MORGAN, AND ALICE MORGAN, ALL OF SAME PLACE.

THILL-SUPPORTER.

SPECIFICATION forming part of Letters Patent No. 273,877, dated March 13, 1883.

Application filed April 29, 1882. (No model.)

*To all whom it may concern:*

Be it known that we, EDGAR H. MORGAN and CHARLES MORGAN, residents of Freeport, in the county of Stephenson and State of Illinois, have invented certain new and useful Improvements in Thill-Supporters; and we do hereby declare the following to be a full, clear, and exact description of the invention, such as will enable others skilled in the art to which it pertains to make and use the same.

The object of our invention is to supply a simple device for catching and supporting the thills of a buggy or wagon when raised up out of use, and so constructed as to readily release them upon the application of a slight downward pressure.

The device consists of a roller, of suitable material, (preferably elastic,) mounted and rotating freely upon an axis, and attached, by means of a clip or other similar device, to the axle of the buggy in such a way as to catch the thill when raised up. Its construction is shown in the accompanying drawings, in which—

Figure 1 is a side view of the thill, showing its attachment to the axle, and showing the thill-supporter attached to lower side of axle. Fig. 2 is a top view of roller and plate to which it is attached, as shown in Fig. 1. Fig. 3 is a side view, and Fig. 4 a top view, of the auxiliary spring attached to thill, as shown in Fig. 1.

As shown in the figures, the thill-supporting device consists of the roller $c$, shaft $g$, yoke $o$, and clip $a$, by means of which it is attached to the under side of the axle $e$, acting in combination with a curved spring, $s$, attached by a clip or bolt to the thill $a$. The manner of operation of the device in this position is clearly shown in Fig. 1, in which the dotted lines show the position of the thill and spring when down. Upon raising the thill the spring $s$ strikes the roller $c$ and yields sufficiently to pass over and partly encircle it, as shown by the full lines of the figure, and the thill is thus supported until released by a downward pull sufficient to roll the spring $s$ forward over the roller $c$.

The roller may be dispensed with and a lug or projection substituted for it; but the use of the roller greatly lessens friction and wear of the parts.

It is evident that instead of attaching the curved spring to the thill and the lug or roller to the axle, as shown in Fig. 1, the positions of the spring and roller may be reversed, the roller being attached to the thill and the spring to the axle.

Having described our invention, what we claim as new, and desire to secure by Letters Patent, is—

1. A spring attached to the upper surface of a buggy-thill, and formed at its free end into a hook adapted to engage with a lug or roller attached to the under side of the axle and projecting in rear thereof, for the purpose of supporting the thill when raised above a horizontal position, substantially as shown and described.

2. The combination of the axle of a buggy, a roller attached to the under side and projecting in rear thereof, the thill of the buggy, and a spring attached to the upper surface thereof and adapted to engage with said roller, substantially as shown and described, and for the purpose set forth.

In testimony whereof we have signed this specification in the presence of two subscribing witnesses.

EDGAR H. MORGAN.
CHARLES MORGAN.

Witnesses:
ROBERT H. WILES,
J. A. SHUTZ.